(No Model.) 3 Sheets—Sheet 1.
J. J. C. SMITH.
BICYCLE TIRE.
No. 519,438. Patented May 8, 1894.
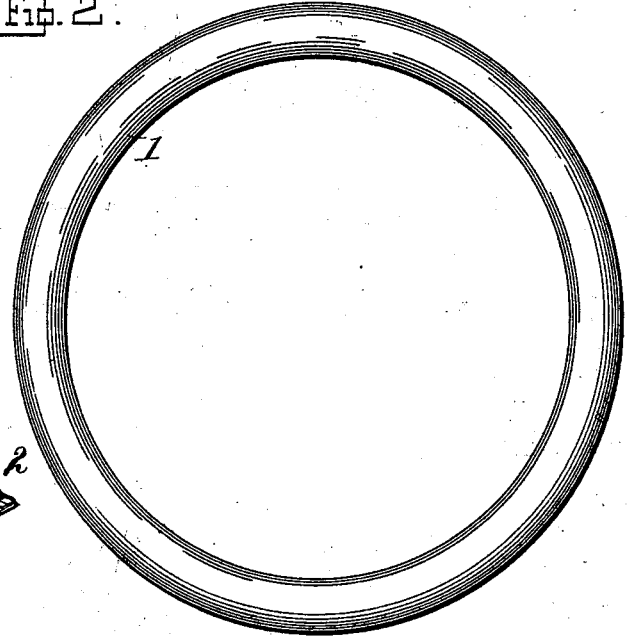
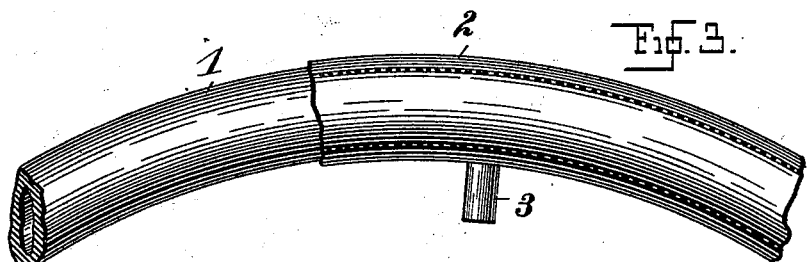
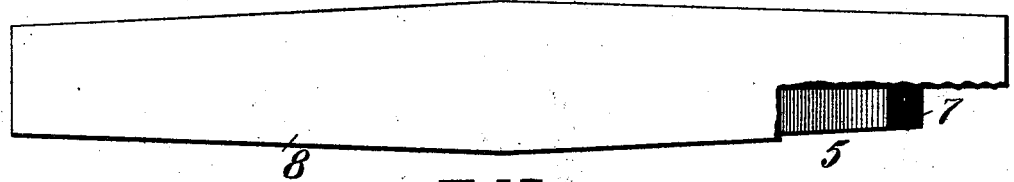
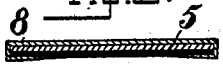
Witnesses Inventor (No Model.)　　　J. J. C. SMITH.　　　3 Sheets—Sheet 2.
BICYCLE TIRE.

No. 519,438.　　　　　　　　Patented May 8, 1894.

Witnesses　　　　　　　　　Inventor (No Model.)  J. J. C. SMITH.  3 Sheets—Sheet 3.
BICYCLE TIRE.

No. 519,438.  Patented May 8, 1894.

Witnesses  Inventor though in a little different way. In such a case I take a rubber tube of the required diameter and the required outside diameter and fill such tube with melted paraffine or ozocerite. I then close the two open ends by tying and thus get a circular tube of wax and rubber.

UNITED STATES PATENT OFFICE.

JOHN J. C. SMITH, OF PASSAIC, NEW JERSEY.

BICYCLE-TIRE.

SPECIFICATION forming part of Letters Patent No. 519,438, dated May 8, 1894.

Application filed April 27, 1893. Serial No. 472,002. (No model.)

*To all whom it may concern:*

Be it known that I, JOHN J. C. SMITH, a citizen of the United States, residing at Passaic, county of Passaic, State of New Jersey, have invented certain new and useful Improvements in Bicycle-Tires, of which the following is a specification.

The object of the invention is the production of a pneumatic bicycle tire which is puncture proof against contact with sharp or pointed objects which the wheel may strike while in use on the road. I accomplish the production of such a puncture proof tire by a combination of a great number of thin steel plates with india rubber and cloth. The steel plates are shaped as segmental cross sections of the hollow tire and are put up in two layers, the several joints of the first layer of such steel plates being overlapped by the second layer. Each one of the thin steel plates is covered with rubber on one side and rubber coated cloth on the other so as to form a firm combination with the rubber main part of the tire. The double layer of thin steel plates arranged in this manner forms a metallic armor without diminishing the flexibility and elasticity of the tire. The manufacture or shaping of my tire requires also a different manipulation from the methods now employed in the manufacture of pneumatic tires. In order to build up and shape my tire, I employ a core on which I build up and shape it. The numerous steel plates which are elastic and must be brought in proper connection with the rubber make a stiff circular core indispensable. At the same time that core must be of such a nature that it can be removed from the interior of the tire through a very small opening which can be readily closed hermetically.

Figure 8:
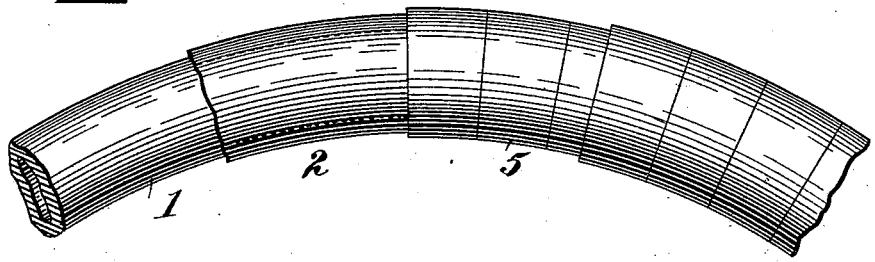
Figure 10:
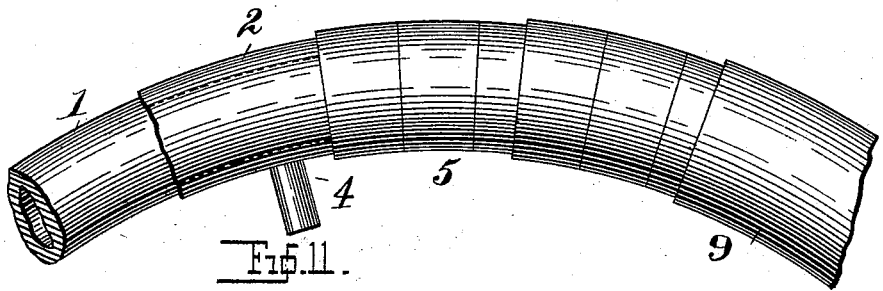
Figure 11:
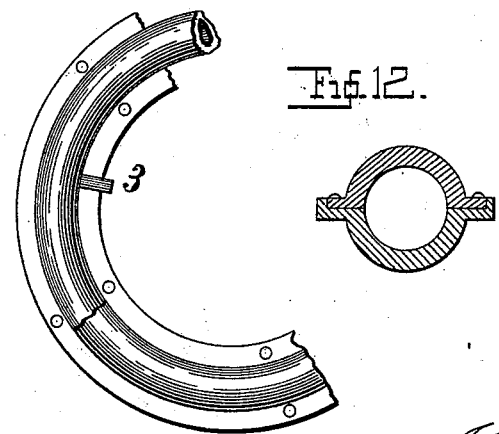
Figure 12:
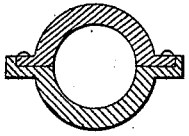
Figure 9:
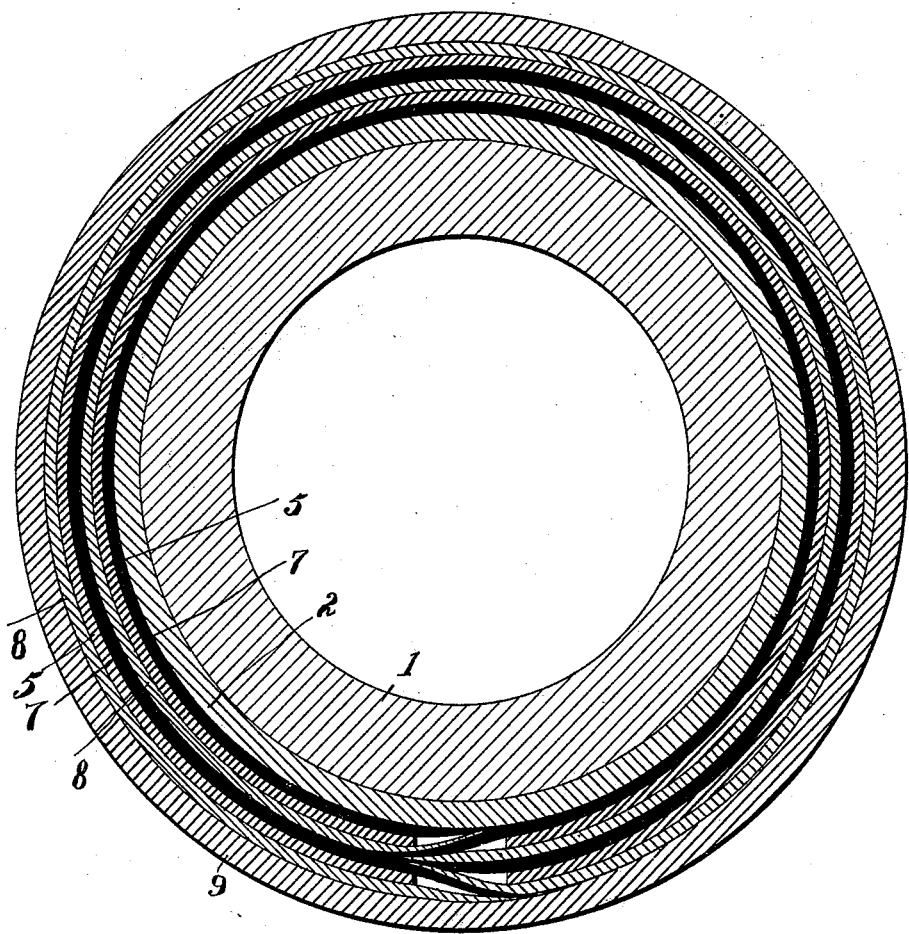

Referring to the accompanying drawings which form a part of this specification: Figures 1 and 2 are views of the tubular core in the two stages of formation. Figs. 3 and 4 are respectively a fragmental side view and a sectional view illustrating the first step in the making of the pneumatic tire on said mandrel. Figs. 5 and 6 are respectively an elevation (partly broken away) and a transverse sectional view of one of the metal protecting pieces. Figs. 7, 8, 9 and 10 are illustrations of parts of the tire at successive steps of the process. Figs. 11 and 12 are sectional views of the vulcanizing mold, the former showing a tire in place and the latter being taken at right angles to the former.

It is obviously impossible in these drawings to show in correct scale the several parts. For the sake of clearness the thickness of some parts—for example the metal and cloth strips—has been exaggerated.

To form of rubber an elastic and air-tight tube in a continuous unbroken circle and combine with the rubber numerous elastic thin steel plates in the manner and for the purpose as I do, it requires a series of manipulations quite different from the methods now employed in the manufacture of pneumatic tires.

In the manufacture of my tire I require a core of stiff material so as to have a certain firm basis on which I can form and build up the different layers of materials of which my tire is formed.

As it is of importance that a tire of my construction shall be of a continuous unbroken structure with no other openings than the air feed valves and another small opening of about one-fourth inch which can be reliably and hermetically closed, I am compelled to form such required core of a material which can be melted at a low temperature or be dissolved by water so that such core may be removed through the small valve openings. The core which I use as a basis to form my tire on, I make of paraffine or ozocerite wax. The manner in which I make such a core is simple. I cast a straight tube such as shown in Fig. 1 of either paraffine, ozocerite or any other suitable wax or mixtures of such. This tube I cut up into lengths suitable to form a circular tube of the required diameter. To do so I place the straight tube of wax in a bath of water of a temperature of about 120° Fahrenheit. By so doing it renders the wax very pliable so that it may be bent over a former into a circular tube of the exact size required. The joint at the meeting ends is then easily united by passing a thin hot metal plate between the ends. This gives a hollow circular tube of the form shown in Fig. 2 which serves as a basis on which I build up and form my tire. The walls of the wax tube when made about an eighth of an inch thick is of sufficient strength to serve its purpose. Or I may form the tube to be used as my core in the circular form shown in Fig. 2 originally of potter's clay which when air-dried will be strong enough to build up on it the tire. Such a clay core may be dissolved and removed from the interior of the tire by water. A circular clay core may be formed in a plaster mold in the same way as artisan potters form cast hollow earthen ware. The great advantage and novelty of making the required core of the materials named will be seen hereinafter. After I have such a core provided I can proceed to form the body of the tire over the core which I do in the following manner: First: I apply a coating of rubber cement on the core 1. This I follow by applying a layer of unvulcanized sheet rubber 2 as shown in Figs. 3 and 4. This layer of rubber is about one thirty-second of an inch thick. It is of the best quality of elastic rubber compounds. I apply this layer in the shape of strips about one and one-fourth inches wide cut from a sheet of the desired thickness. Such strips are laid on and cemented to the core longitudinally as shown by the dotted lines in Fig. 3 as this manner of laying has proved more practical than wrapping around the core. Care must be taken that all joints of the strips against each other are made perfect. After this first layer of rubber is applied the valves 3 and 4 are placed in position on the inner periphery of the tire—one opposite the other. These valves may be of any one kind of the different sorts in use on pneumatic tires. Only in my case I use in addition to the usual check valve 3 an outlet valve 4 for the purpose of removing my core in the manner hereinafter stated. After the two valves are placed in the proper position as stated, I apply the first layer of steel plates 5, each of the plates being previously covered and prepared in the manner hereinafter stated. These steel plates are cut from thin sheet steel, the thickness of which is about one two-hundredth part of an inch. The shape of each plate 5 is that of a segment cut out of a circular tube in cross section as shown in Fig. 5. These plates (see Figs. 5 and 6) are covered on one side with a layer 6 of unvulcanized rubber one-thirty-second of an inch thick. The rubber cover extends beyond the ends of the steel plate 5 about one-fourth of an inch as indicated at 7 in Fig. 5. On the other side of the steel plate a strip 8 of strong fine cotton or linen cloth, previously prepared with rubber cement is fastened. This cotton or linen strip 8 is about one-fourth of an inch wider than the steel plate 5 and about three-fourths of an inch longer than the plate. The over projecting longitudinal edges of the cloth strip are folded over the edge of the steel plate and are brought to join the rubber on the opposite end of the plate. By so doing, the steel plate is enveloped in cloth and rubber. The ends of the cloth strip are left to project over the ends of the steel plate so as to serve afterward as a tie to hold the plate on the core. The steel plates 5 are about one inch wide and of a length to reach nearly (say within a quarter of an inch) around the tire in cross section. The projecting ends of the rubber and cloth incasing the steel plate are then long enough to reach completely around in cross section and have some to spare to lap over each other. These prepared steel plates are laid over the first rubber layer on the core in this manner: One end of the plate (see Fig. 7) is laid with its rubber side against the first rubber cover 2 over the core 1. The layer is started at the center of the inner periphery of the tire. One projecting rubber end 7 of the plate is pressed against the inner periphery of the first rubber cover 2 and there adheres. Then the covered steel plate is firmly drawn or laid around the core until the other projecting end of rubber and cloth is brought over the first fastened end against which it is pressed, thereby completing a hoop around the core a part of the hoop being of steel but a small portion 7 at the inner periphery being of rubber and cloth. The adhesiveness of the rubber to rubber and the rubber coated cloth keeps the steel plate in proper position. Close to this first steel hoop a second one is laid and so on all around the core until a complete first layer of rubber and cloth covered steel plates 5 is made. Over this first layer of steel plates a second one is made in the same manner. On the second layer the rubber side of the second plate must lay against the cloth side of the first. Care is taken that the joints of the second layer overlap the joints of the first layer. It is hardly necessary to state that the steel plates must be cut out to admit of laying and fitting around the metal valve stems or tubes 3 and 4 and that the joints around them must be well made with rubber and cloth. After the second layer of steel plates is properly put on a final layer 9 of rubber about one-sixteenth of an inch in thickness is carefully applied in the same manner as the first layer applied direct to the core. This outside layer of rubber may be increased in thickness at the outer periphery or tread of the tire. The tire is now so far ready and shaped that the core may be removed. This is readily accomplished by passing a small stream of boiling hot water through the hollow wax core which melts the wax. The water is admitted by valve 3 and passes out at valve or opening 4 carrying the melted wax with it. The current of water is kept up until all the wax is removed. In case a core of clay is used as indicated, the core may remain in the tire until after vulcanization when it may be washed out by a current of water. A wax core should be removed before vulcanization because it injures the strength of the rubber under the heat of vulcanization. The tire is now ready to undergo vulcanization which is done in a metal mold of a construction as indicated in Figs. 10 and 11.

The method of vulcanization which I prefer is that described by myself and Charles Grasser in our United States Letters Patent No. 178,479, and bearing date June 6, 1876, granted for improvements in manufacture of rubber pattern molds, &c. This method is especially preferable for vulcanizing my tire because the vulcanization takes place in a non elastic fluid, namely, hot water under a high pressure which affords the following advantages: I can use a very light metal mold 10 which needs only holding together by a few small screws 11 because the pressure applied to the water in which the vulcanization takes place acts with equal force on the larger exterior surface of the mold and holds it firmly together against the equal internal pressure acting against a smaller surface.

To vulcanize a hollow rubber object which shall require a certain well defined shape of the mold, interior pressure is required to obtain which several methods are in use. I prefer the solid water pressure which I find to work most satisfactory in vulcanizing my tire. The joints of the mold in which I vulcanize the tire I provide with a very thin rubber packing. The valve stems 3 and 4 extend over the edge of the metal mold so that the water under pressure will find entrance to the hollow interior of the tire and expands it to fill the mold perfectly. At the same time the solid water pressure acting on the exterior of the mold holds it firmly together and saves the bolting together of the mold which is necessary if other methods of internal pressure are employed.

The heat and time required to vulcanize my tire depends on the quality and composition of the rubber compound used for it. Persons skilled in the art of making sundry rubber goods are fully aware of that knowledge.

I have so far fully described the manner and manipulations of forming my pneumatic tire; but in order that misunderstandings may be avoided as to my claims to the novel and useful points of my invention, I have to state that I am aware that others have made pneumatic tires which are provided with a metallic armor to render the tire puncture proof.

The several manners in which such metallic armors are brought in combination with rubber to form a puncture proof tire are however greatly different from mine and as long as the broad principle of a metallic armor on a pneumatic bicycle tire is not new, I confine my claims of novelty to the peculiar construction, arrangement and combination of steel or metal plates with rubber in the manner and shape as I describe it; furthermore, to the novel manner in which I build up or form my tire on a core which can be removed from the interior of the tire through a very small aperture which may be easily closed hermetically.

Sundry experiments which I have made to find the proper and serviceable shape and arrangement of a metallic armor for a pneumatic tire have convinced me that the metallic plates must be of a segmental shape when laid on in cross section because the armor must be flexible, elastic and act at the same time as a free spring to prevent cutting of the rubber. The difficulty of forming such a tire as mine has also forced me to invent the peculiar novel method of forming and removing the core to produce a tire without joints or large openings to remove the core.

Having thus described my invention, the following is what I claim as new therein and desire to secure by Letters Patent:

1. In the process of vulcanizing hollow rubber articles, laying up the rubber on a core of paraffine, wax or equivalent material which may be removed by flowing liquid through the article, substantially as set forth.

2. A core or mandrel for forming rubber articles preparatory to vulcanizing consisting of paraffine, wax or equivalent material.

3. A core or mandrel for forming rubber articles preparatory to vulcanizing consisting of a tube of paraffine, wax or equivalent material.

4. A bicycle tire composed of rubber having an inner and an outer tube or layer of rubber and interlaid segmental strips of metal between said rubber layers laid edge to edge around the tire, and of greater length than one-half the tire's circumference, substantially as set forth.

5. A bicycle tire composed of rubber having two overlapping layers of independent interlaid segmental metallic strips somewhat less in length than the circumference of the tire in cross section, substantially as set forth.

6. A bicycle tire of rubber having interlaid metallic strips coated on one side with a strip of rubber and on the other with cloth and adapted to operate substantially as set forth.

7. In combination with the rubber tubes of a pneumatic bicycle tire, interlaid metallic strips having rubber on one side of greater length than the strips and cloth facings on the other side extending beyond the rubber, substantially as and for the purposes set forth.

8. The method of making a bicycle tire consisting in forming a core of paraffine, wax or equivalent material, laying thereon a coating of rubber, covering the same with segmental metallic strips which nearly but not quite surround the tire in cross section, laying thereover an exterior coating of rubber and removing the core and vulcanizing, substantially as set forth.

J. J. C. SMITH.

Witnesses:
 HERBERT KNIGHT,
 M. V. BIDGOOD.